(12) United States Patent
Rajwan et al.

(10) Patent No.: US 12,197,265 B2
(45) Date of Patent: *Jan. 14, 2025

(54) TELEMETRY PUSH AGGREGATION

(71) Applicant: Apple Inc., Cupertino, CA (US)

(72) Inventors: Doron Rajwan, Rishon LeZion (IL);
Karl Daniel Wulcan, San Diego, CA (US); Lital Levy-Rubin, Tel Aviv (IL); Tal Kuzi, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,525

(22) Filed: Nov. 15, 2023

(65) Prior Publication Data
US 2024/0160267 A1 May 16, 2024

Related U.S. Application Data

(63) Continuation of application No. 17/313,837, filed on May 6, 2021, now Pat. No. 11,822,411.

(51) Int. Cl.
*G06F 1/3206* (2019.01)
*G06F 11/30* (2006.01)
*G06F 11/34* (2006.01)

(52) U.S. Cl.
CPC ........ *G06F 1/3206* (2013.01); *G06F 11/3003* (2013.01); *G06F 11/3062* (2013.01); *G06F 11/3495* (2013.01)

(58) Field of Classification Search
CPC .............. G06F 1/3206; G06F 11/3003; G06F 11/3062; G06F 11/3495
See application file for complete search history.

(56) References Cited

U.S. PATENT DOCUMENTS

| | | | |
|---|---|---|---|
| 8,589,922 B2 | 11/2013 | Adar et al. | |
| 11,822,411 B2* | 11/2023 | Rajwan | G06F 11/3495 |
| 2008/0040715 A1 | 2/2008 | Cota-Robles et al. | |
| 2009/0007134 A1 | 1/2009 | Chiu et al. | |
| 2011/0172968 A1 | 7/2011 | Davis et al. | |
| 2016/0092363 A1 | 3/2016 | Wang et al. | |
| 2018/0341620 A1 | 11/2018 | Letey et al. | |
| 2020/0348973 A1 | 11/2020 | Kutch | |
| 2021/0004265 A1 | 1/2021 | Guim Bernat et al. | |
| 2021/0014114 A1 | 1/2021 | Doshi et al. | |
| 2022/0100247 A1 | 3/2022 | Garg et al. | |
| 2022/0357784 A1 | 11/2022 | Rajwan et al. | |

* cited by examiner

*Primary Examiner* — Gary Collins
(74) *Attorney, Agent, or Firm* — Robert C. Kowert; Kowert, Hood, Munyon, Rankin & Goetzel, P.C.

(57) ABSTRACT

Systems, apparatuses, and methods for implementing telemetry push aggregation techniques are described. A computing system includes one or more input/output (I/O) agents interposed between functional units and a communication fabric. A given I/O agent receives a set of aggregation rules from a power management unit. The I/O agent monitors traffic from the functional units, and the I/O agent generates telemetry data from the traffic data based on the set of aggregation rules. The telemetry data is used by the power management unit to make adjustments to one or more power settings.

20 Claims, 11 Drawing Sheets

| Number | Counter | Description | Update Method |
|---|---|---|---|
| 0 | Read Transactions Bandwidth Counter | Total Bandwidth of Upstream Memory Read Transactions | Increment per Each 64 Bytes |
| 1 | Write Transactions Bandwidth Counter | Total Bandwidth of Upstream Memory Write Transactions | Increment per Each 64 Bytes |
| 2 | Clock Utilization Counter | Counts Cycles of Clock when the I/O Agent is not Clock Gated | Increment on Each Clock Cycle |
| 3 | I/O Agent Utilization Counter | Counts Transactions that are entering the Aggregator Pipe | Increment per Each 64 Bytes |
| 4 | Fabric Request Utilization Counter | Counts Transaction Commands that are Fabric Requests | Increment per Each 64 Bytes |
| 5 | Fabric Response Utilization Counter | Counts Transaction Commands that are Fabric Responses | Increment per Each 64 Bytes |
| 6 | Functional Unit Specific Utilization Counter | Counts Transactions Generated by Specific Functional Unit | Increment per Each 64 Bytes |

605
Receive, by an I/O Agent, a First Set of Aggregation Rules from a Power Management Unit

610
Monitor Traffic Generated by a Plurality of Functional Units, wherein the Traffic Traverses a Communication Fabric

615
Aggregate Traffic Data from the Plurality of Functional Units

620
Generate Telemetry Data from the Traffic Data based on the First Set of Aggregation Rules

625
Convey the Telemetry Data to the Power Management Unit, wherein the Power Management Unit Adjusts One or More Power Settings based on the Telemetry Data

*FIG. 6*

```
                                    800
                                   ┌─┘
                    805
                   ┌─┘
        ┌─────────────────────────┐
        │ Monitor, by an I/O Agent,│
        │ a First Set of Events    │
        │ associated with a Plurality│
        │ of Functional Units,     │
        │ wherein the First Set of │
        │ Events are Defined by a  │
        │ First Set of Aggregation │
        │ Rules                    │
        └─────────────┬────────────┘
                      │  810
                      ▼ ┌─┘
        ┌─────────────────────────┐
        │ Receive, by the I/O Agent,│
        │ a Second Set of          │
        │ Aggregation Rules from a │
        │ Power Management Unit,   │
        │ wherein the Second Set of│
        │ Aggregation Rules are    │
        │ Different from the First │
        │ Set of Aggregation Rules │
        └─────────────┬────────────┘
                      │  815
                      ▼ ┌─┘
        ┌─────────────────────────┐
        │ Monitor, by the I/O Agent,│
        │ a Second Set of Events   │
        │ associated with the      │
        │ Plurality of Functional  │
        │ Units, wherein the Second│
        │ Set of Events are        │
        │ Different from the First │
        │ Set of Events            │
        └─────────────┬────────────┘
                      │  820
                      ▼ ┌─┘
        ┌─────────────────────────┐
        │ Generate Telemetry Data  │
        │ based on the Second Set  │
        │ of Events                │
        └─────────────┬────────────┘
                      │  825
                      ▼ ┌─┘
        ┌─────────────────────────┐
        │ Convey the Telemetry Data│
        │ to the Power Management  │
        │ Unit, wherein the Power  │
        │ Management Unit Adjusts  │
        │ One or More Power        │
        │ Settings based on the    │
        │ Telemetry Data           │
        └─────────────────────────┘
```

*FIG. 8*

TELEMETRY PUSH AGGREGATION

PRIORITY INFORMATION

This application claims priority to U.S. patent application Ser. No. 17/313,837, entitled "Telemetry Push Aggregation," filed May 6, 2021, which is hereby incorporated by reference in its entirety as though fully and completely set forth herein.

BACKGROUND

Technical Field

Embodiments described herein relate to electronic systems and, more particularly, to techniques for tracking telemetry data on integrated circuits.

Description of the Related Art

Managing power consumption in electronic systems has taken on a greater importance in recent years. This particularly holds true with the proliferation of portable electronic systems (e.g., tablet computers, smart phones, etc.) which utilize a battery as their primary power source. Thermal control in electronic systems (which is related to power consumption) has also taken on greater importance.

In typical processor-based systems, one or more operating voltages may be increased for larger processing workloads, and decreased for smaller processing workloads as well as for idle periods. Clock frequencies may also be increased or decreased according to processing workloads. Increasing the voltage and/or the clock frequency for a processor may result in greater power consumption and higher temperatures on the integrated circuit(s) used to implement a system. To manage power consumption and thermal output, many electronic systems implement power management control functions that may be hardware and/or software-based. In implementing these control functions, voltage, power and temperature safety margins may be utilized. These margins may set limits on the voltages, the amount of power consumed, and the on-die temperature of integrated circuits within the system. By enforcing these margins using the built-in control functionality, power consumption and thermal output of the system may be maintained within a safe operating envelope.

SUMMARY

Systems, apparatuses, and methods for implementing telemetry push aggregation techniques are contemplated.

In one embodiment, a computing system includes one or more input/output (I/O) agents interposed between functional units and a communication fabric. A given I/O agent receives a set of aggregation rules from a power management unit. The I/O agent monitors traffic from the functional units, and the I/O agent generates telemetry data from the traffic data based on the set of aggregation rules. The telemetry data is used by the power management unit to make adjustments to one or more power settings These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which:

FIG. 5 is a block diagram of one embodiment of a mapping table.

FIG. 6 is a flow diagram of one embodiment of a method for aggregating telemetry data.

FIG. 8 is a flow diagram of one embodiment of a method for updating aggregation rules.

Figure 1:
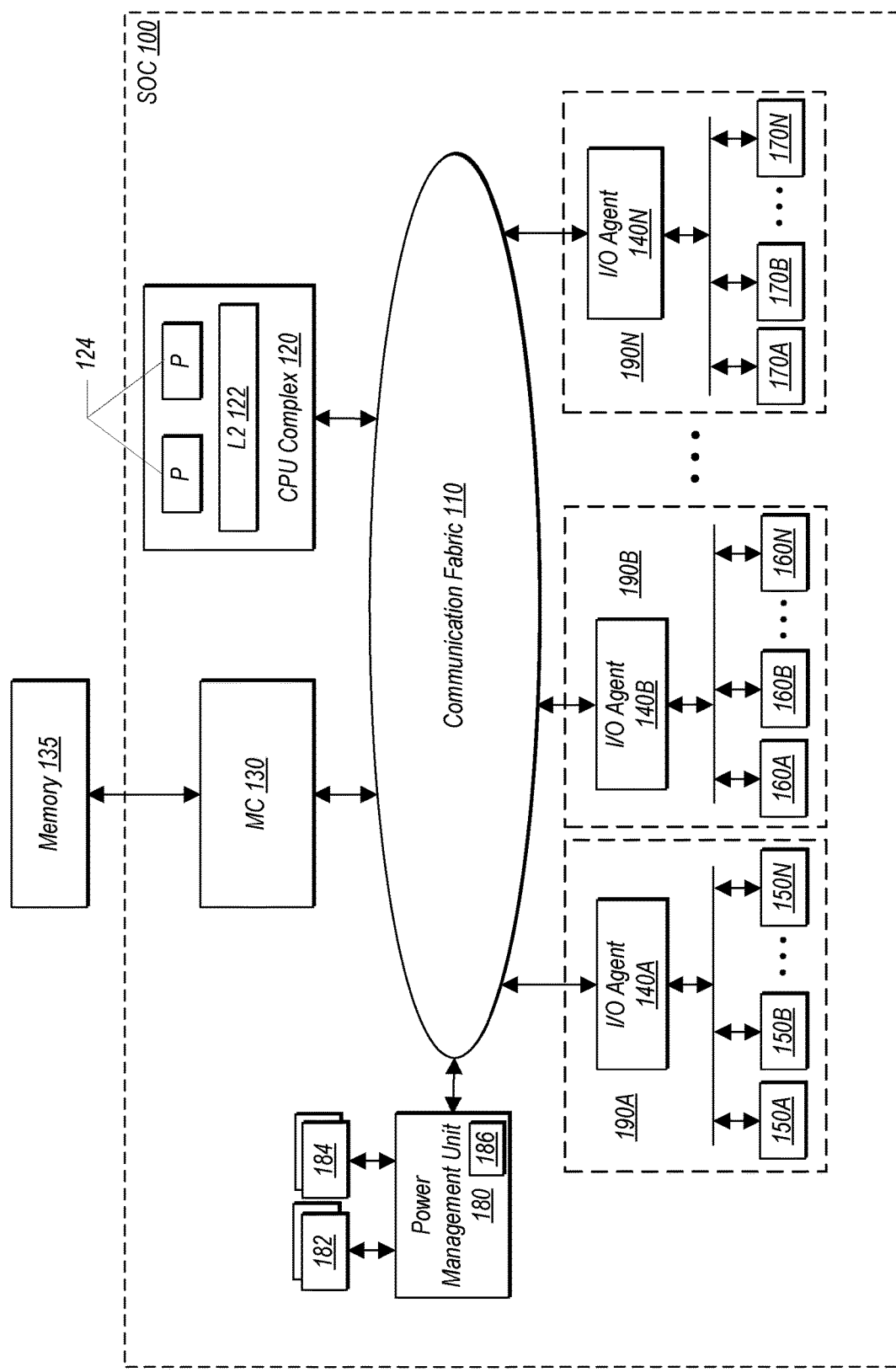
FIG. 1 is a generalized block diagram of one embodiment of a SOC.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring now to FIG. 1, a block diagram of one embodiment of a system-on-a-chip (SOC) is shown. SOC 100 is shown coupled to a memory 135. As implied by the name, the components of the SOC 100 may be integrated onto a single semiconductor substrate as an integrated circuit "chip". In some embodiments, the components may be implemented on two or more discrete chips in a system. However, the SOC 100 will be used as an example herein. In the illustrated embodiment, the components of the SOC 100 include a central processing unit (CPU) complex 120, input/output (I/O) agents 140A-140N, on-chip functional units 150A-150N, 160A-160N, and 170A-170N (which can also be referred to as peripheral components), a memory controller (MC) 130, a power management unit 180, phase-locked loops (PLLs) 182, voltage regulators 184, and a communication fabric 110. The components 120, 130, 140A-140N, 150, and 180 may all be coupled to the communication fabric 110. The memory controller 130 may be coupled to the memory 135 during use, and any of functional units 150A-150N, 160A-160N, and 170A-170N may be coupled to one or more external interfaces (not shown) during use. In the illustrated embodiment, the CPU complex 120 includes one or more processors (P) 124 and a level two (L2) cache 122.

The functional units 150A-150N, 160A-160N, and 170A-170N may be any set of additional hardware functionality included in the SOC 100. For example, the functional units 150A-150N, 160A-160N, and 170A-170N may include video peripherals such as an image signal processor configured to process image capture data from a camera or other image sensor, display controllers configured to display video data on one or more display devices, graphics processing units (GPUs), video encoder/decoders, scalers, rotators, blenders, etc. The functional units may include audio peripherals such as microphones, speakers, interfaces to microphones and speakers, audio processors, digital signal processors, mixers, etc. The functional units may include interface controllers for various interfaces external to the SOC 100 interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

It is noted that each separate collection of an I/O agent and their corresponding functional units may be referred to as sub-fabric 190A-190N. Within each distinct sub-fabric 190A-190N, the corresponding I/O agent 140A-140N is responsible for monitoring traffic and collecting the necessary telemetry data. Each distinct sub-fabric 190A-190N can have a separate set of aggregation rules which determines which traffic is monitored and how the telemetry data is collected and conveyed to power management unit 180 and stored in dashboard 186. When power management unit 180 desires to make a change to the aggregation rules for a given sub-fabric, power management unit 180 conveys the updated aggregation rules to only the I/O agent rather than to all of the functional units within the given sub-fabric. This makes it more efficient and simpler to make changes to the collection of telemetry data since the functional units do not need to be aware of or make changes in response to an update of the aggregation rules.

In one embodiment, SOC 100 includes CPU complex 120. The CPU complex 120 may include one or more CPU processors 124 that serve as the CPU of the SOC 100. The CPU of the system includes the processor(s) that execute the main control software of the system, such as an operating system. Generally, software executed by the CPU during use may control the other components of the system to realize the desired functionality of the system. The processors 124 may also execute other software, such as application programs. The application programs may provide user functionality, and may rely on the operating system for lower level device control. Accordingly, the processors 124 may also be referred to as application processors.

The CPU complex 120 may further include other hardware such as the L2 cache 122 and/or an interface to the other components of the system (e.g., an interface to the communication fabric 110). Generally, a processor may include any circuitry and/or microcode configured to execute instructions defined in an instruction set architecture implemented by the processor. The instructions and data operated on by the processors in response to executing the instructions may generally be stored in the memory 135, although certain instructions may be defined for direct processor access to peripherals as well. Processors may encompass processor cores implemented on an integrated circuit with other components as a system on a chip or other levels of integration. Processors may further encompass discrete microprocessors, processor cores, and/or microprocessors integrated into multichip module implementations, processors implemented as multiple integrated circuits, and so on.

The memory controller 130 may generally include the circuitry for receiving memory operations from the other components of the SOC 100 and for accessing the memory 135 to complete the memory operations. The memory controller 130 may be configured to access any type of memory 135. For example, the memory 135 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 130 may include queues for memory operations, for ordering (and potentially reordering) the operations and presenting the operations to the memory 135. The memory controller 130 may further include data buffers to store write data awaiting write to memory and read data awaiting return to the source of the memory operation.

The communication fabric 110 may be any communication interconnect and protocol for communicating among the components of the SOC 100. The communication fabric 110 may be bus-based, including shared bus configurations, cross bar configurations, and hierarchical buses with bridges. The communication fabric 110 may also be packet-based, and may be hierarchical with bridges, cross bar, point-to-point, or other interconnects. It is noted that the number of components of the SOC 100 (and the number of subcomponents for those shown in FIG. 1, such as within the CPU complex 120) may vary from embodiment to embodiment. There may be more or fewer of each component/subcomponent than the number shown in FIG. 1.

Figure 2:
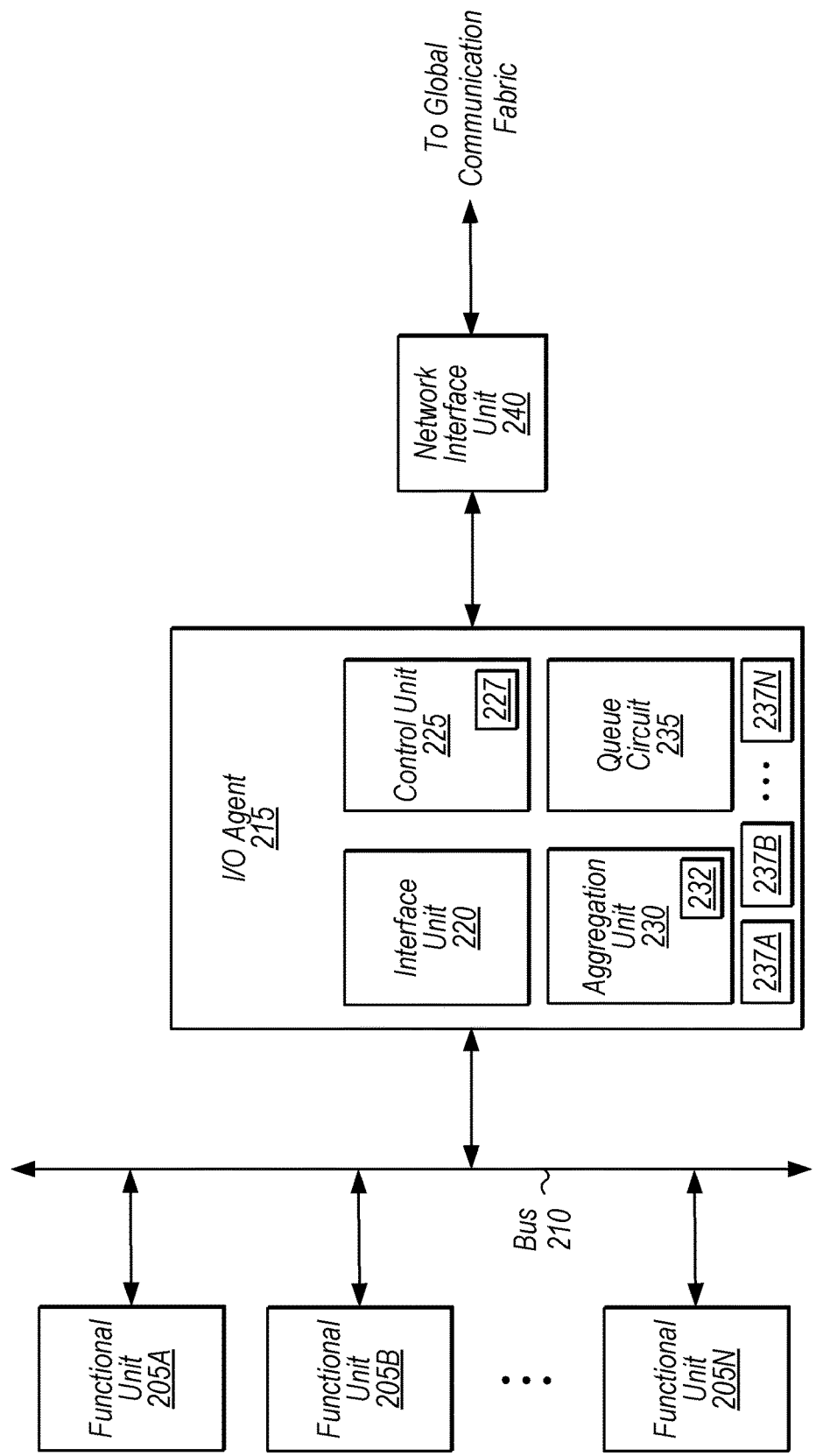
FIG. 2 is a block diagram of one embodiment of an I/O agent.

Turning to FIG. 2, an embodiment of a block diagram of a sub-fabric 200 anchored by an I/O agent 215 which is connected to multiple functional units 205A-205N is illustrated. As shown, I/O agent 215 provides the connection to the global communication fabric (e.g., communication fabric 110 of FIG. 1) via network interface unit 240 for the multiple functional units 205A-205N. I/O agent 215 is connected to functional units 205A-205N via bus 210. In one embodiment, I/O agent 215 includes at least interface unit 220, control unit 225, aggregation unit 230, queue circuit 235, and hardware resources 237A-N. In other embodiments, I/O agent 215 may include other arrangements of components and circuitry for the various elements. It is noted that I/O agent 215 may be implemented using any combination of hardware and/or program instructions (e.g., in the form of firmware or software instructions). For example, I/O agent 215 may include one or more of combinatorial logic, finite state machines, control and status registers along with an interface to retrieve and execute firmware or other software instructions for running particular subroutines when particular values are stored in a subset of the control and status registers. It is noted that sub-fabric 200 may also be referred to herein as an "I/O cluster".

In one embodiment, control unit 225 monitors traffic generated by functional units 205A-205N which traverses the global communication fabric. Also, control unit 225 receives aggregation rules from a power management unit (e.g., power management unit 180 of FIG. 1), with the aggregation rules stored in storage elements 232 by aggregation unit 230. Depending on the embodiment, the aggregation rules specify one or more of which types of transactions to monitor, which sources to monitor, which endpoints to monitor, an update frequency for sending updates to the power management unit, which types of events to count, a telemetry data update interval for one or more functional units, and so on. In one embodiment, aggregation unit 230 aggregates traffic data based on the transactions, operating conditions, and other events associated with functional units 205A-205N. Also, aggregation unit 230 generates telemetry data from the traffic data based on the aggregation rules. In various embodiments, the telemetry data includes one or more of power consumption data, a number of memory requests generated, a number of write requests generated, a number of read requests generated, a number of instructions executed, a number of cache hits, a number of cache misses, and so on. The telemetry data may also include identifiers specifying to which functional units the telemetry data corresponds. The telemetry data is used by the power management unit to make adjustments to one or more power settings.

In one embodiment, interface unit 225 is coupled to local bus 210 and is configured to bridge transactions between functional units 205A-205N and the global communication fabric. In one embodiment, queue circuit 235 includes any number and size of queues for storing received transactions. Queue circuit 235 can also include elements for storing commands, aggregation rules, and/or other data and instructions. Hardware resources 237A-237N include any number and type of resources such as counters, registers, and so on. In one embodiment, control unit 225 manages the assignment of hardware resources 237A-237N to the various functional units 205A-205N. For example, in this embodiment, control unit 225 includes mapping table 227 with mappings of particular functional units to the hardware resources 237A-237N. The assignment of hardware resources 237A-237N to the various functional units 205A-205N may be dynamically updated based on the operating conditions of sub-fabric 200. For example, various ones of functional units 205A-205N may transition between an active or idle state, and when a given functional unit transitions from active to idle, its hardware resources can be reassigned to one of the other functional units 205A-205N. This highlights an efficiency gained by having I/O agent 215 manage the hardware resources for sub-fabric 200 rather than having each functional unit manage its own local hardware resources. In this case, the total amount of hardware resources needed for the entirety of sub-fabric 220 is reduced since these resources can be dynamically reassigned.

In one embodiment, the global communication fabric includes multiple independent networks having different communication and coherency protocols. Also, in one embodiment, the system includes a plurality of I/O clusters (of which sub-fabric 200 is a given I/O cluster) that includes different sets of local functional circuits. Sub-fabric 200 is coupled to one or more of the independent networks of the global communication fabric. One or more of the other I/O clusters also include a particular set of local functional units, a local bus coupled to the particular set of local functional circuits, and an interface circuit coupled to the local bus and configured to bridge transactions between the particular set of local functional circuits and the global communication fabric.

Figure 3:
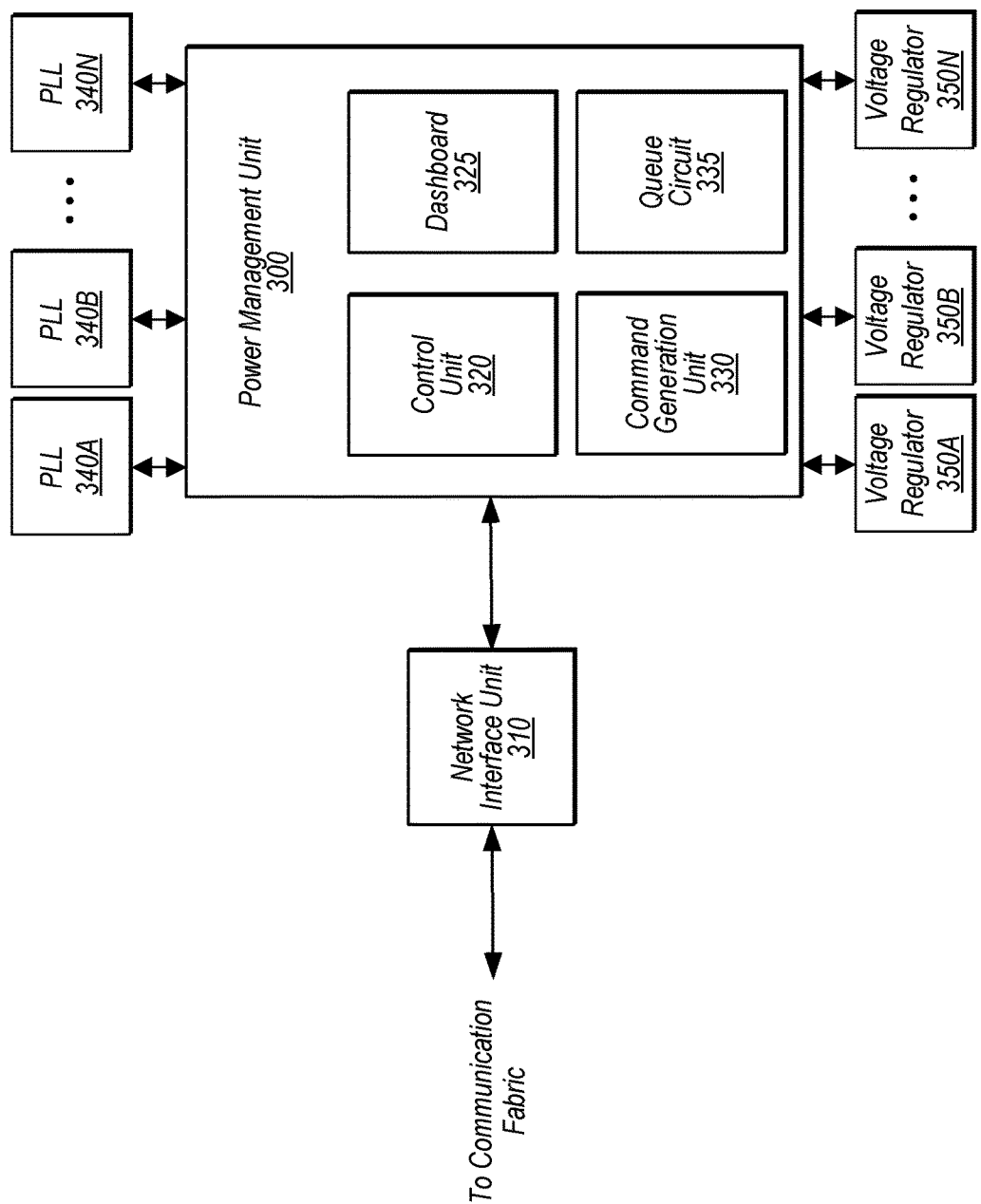
FIG. 3 is a block diagram of one embodiment of a power management unit.

Referring now to FIG. 3, a block diagram of one embodiment of a power management unit 300 and associated circuitry is shown. In one embodiment, power management unit 300 is coupled to a global communication fabric (e.g., communication fabric 110 of FIG. 1) via network interface unit 310. Power management unit 300 is also coupled to phase-locked loops (PLLs) 340A-340N and voltage regulators 350A-N. In other embodiments, power management unit 300 may be coupled to various other circuits and control units for adjusting settings related to the operation of the overall system (e.g., system 100).

In one embodiment, power management unit 300 includes control unit 320, dashboard 325, command generation unit 330, and queue circuit 335. In other embodiments, power management unit 300 may include other arrangements of circuitry for performing the various functions described herein. In one embodiment, control unit 320 monitors the telemetry data received from the one or more I/O agents dispersed throughout the system. Control unit 320 also generates and conveys aggregation rules to the various I/O agents. Control unit 320 is responsible for updating the aggregation rules and forwarding updated aggregation rules to the I/O agents as conditions dictate. Additionally, control unit 320 populates dashboard 325 with the received telemetry data.

In one embodiment, control unit 320 analyzes the telemetry data to determine when to make adjustments to one or more power settings. For example, if it is determined from the telemetry data that the power consumption of the system is exceeding or will soon exceed a power threshold, control unit 320 can cause a reduction of power consumption to take place by reducing the frequencies generated by PLLs 340A-340N and provided to the various components (e.g., processors) and/or by reducing the voltages generated by voltage regulators 350A-350N which supply power to the system's components. In one embodiment, command generation unit 330 generates the specific commands to reprogram PLLs 340A-340N and voltage regulators 350A-350N. In one embodiment, queue circuit 335 stores the received telemetry data until control unit 320 is able to process the telemetry data. Queue circuit 335 can also store any other data or instructions which are received by power management unit 300.

Figure 4:
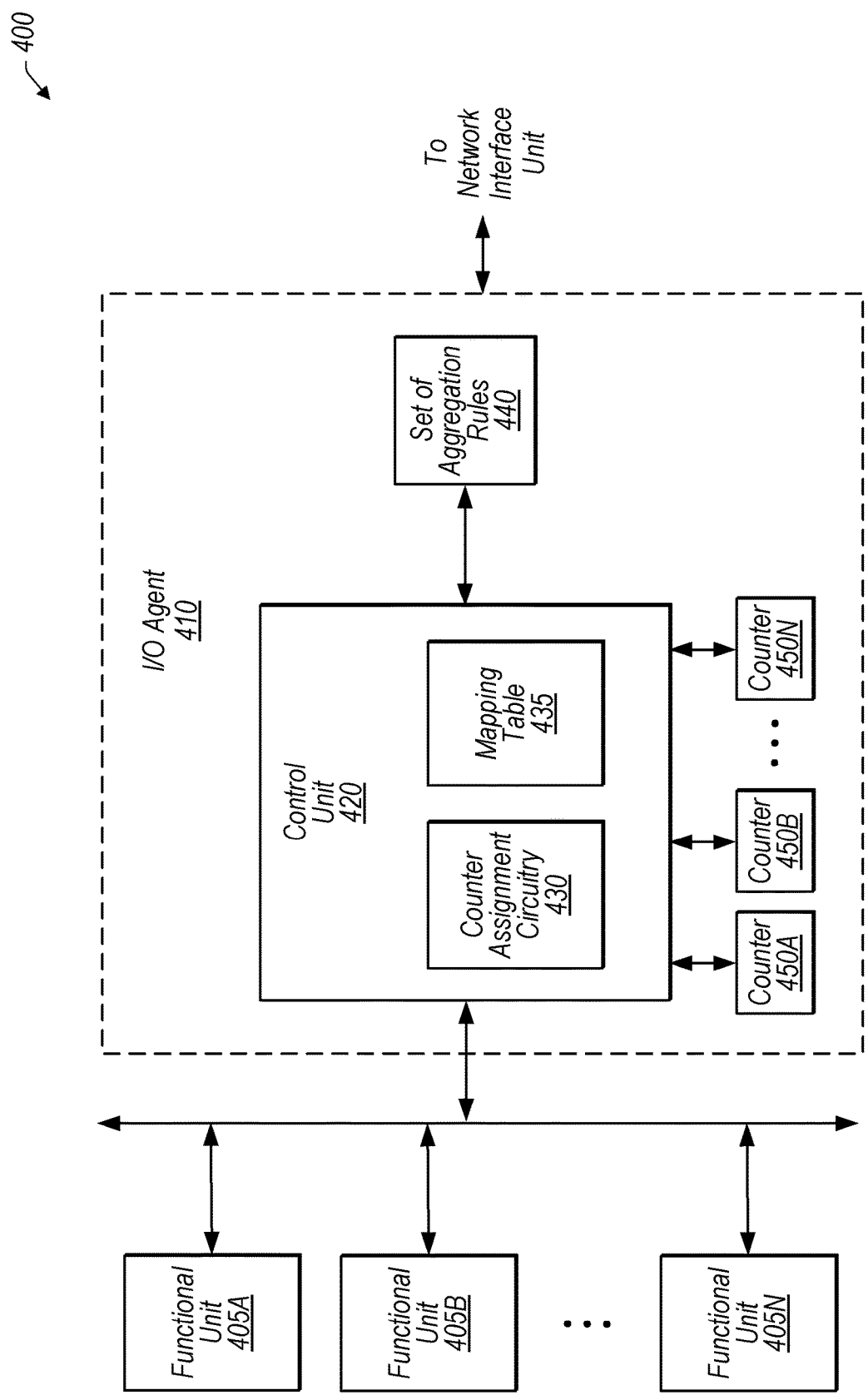
FIG. 4 is a block diagram of one embodiment of an I/O agent.

Turning now to FIG. 4, a block diagram of one embodiment of an I/O cluster 400 is shown. In one embodiment, I/O cluster 400 includes I/O agent 410 and functional units 405A-405N, which are representative of any number and type of functional units, peripheral devices, and the like. As shown, I/O agent 410 includes at least control unit 420, set of aggregation rules 440, and counters 450A-N. Also, control unit 420 includes at least counter assignment circuitry 430 and mapping table 435 which maps functional units 405A-405N to counters 450A-450N. It is noted that although not shown in FIG. 4, control unit 420 may also include other mapping tables for mapping functional units 405A-405N to other types of hardware resources.

In one embodiment, the mappings of functional units 405A-405N to counters 450A-450N are generated based on set of aggregation rules 440. For example, in one embodiment, set of aggregation rules 440 may specify which counters 450A-450N should be assigned to the various functional units 405A-405N based on current operating conditions. For example, if functional unit 405A is a camera and the camera is active at a first point in time, a relatively large number of counters 450A-450N may be allocated for tracking various camera-related metrics. Continuing with this example, if functional unit 405B is a USB interface, and nothing is plugged into the USB drive at the first point in time, then set of aggregation rules 440 may specify that none of the counters are allocated to functional unit 405B at the first point in time.

Continuing with the above example, if at a second point in time later than the first point in time, the camera becomes idle and a USB device is plugged into the USB interface, I/O agent 410 may receive a new set of aggregation rules to replace the prior set of aggregation rules 440. The new set of aggregation rules may specify that a relatively large number of counters 450A-450N should now be allocated and mapped to functional unit 405B. In one embodiment, at least a portion of the counters 450A-450N that were previously assigned to functional unit 405A (i.e., the camera) are reassigned to functional unit 405B (i.e., the USB interface). Other similar scenarios can take place for other types of functional units as these functional units transition between the active and idle states.

Referring now to FIG. 5, an example of a mapping table 500 in accordance with one embodiment is shown. It is noted that in one embodiment, mapping table 435 may include the contents shown in mapping table 500. In other embodiments, mapping table 435 may include other contents which are structured in other suitable manners. Depending on the embodiment, mapping table 500 may be hard-coded, programmable, or constructed in other suitable manners.

As shown in mapping table 500, each entry is identified by a number (0-6) and a name, description, and update method of the counter. For example, entry 0 is a read transactions bandwidth counter which increments for each 64 bytes. In other embodiments, the counter indicated by entry 0 increments for other number of bytes besides 64 bytes. Similar to entry 0, entry 1 specifies a write transactions bandwidth counter which increments for each 64 bytes. Depending on the embodiment, entries 0 and 1 can transactions of an individual functional unit or can track transactions across multiple functional units.

Entry 2 of mapping table 500 specifies a clock utilization counter which counts the clock cycles when the I/O agent is not clock gated. Entry 3 is an I/O agent utilization counter which counts 64-byte transactions that are entering the aggregator pipe. Entries 4 and 5 are for counters which track fabric requests and responses, respectively. Entry 6 is a functional unit specific utilization counter which counts transactions generated by a specific functional unit. It is noted that mapping table 500 can also include any number of other entries for counters which count transactions for different functional units. It is also noted that mapping table 500 may also include any number of other entries for other types of counters.

Turning now to FIG. 6, a generalized flow diagram of one embodiment of a method 600 for aggregating traffic data is shown. For purposes of discussion, the steps in this embodiment (as well as for FIGS. 7-10) are shown in sequential order. However, in other embodiments some steps may occur in a different order than shown, some steps may be performed concurrently, some steps may be combined with other steps, and some steps may be absent.

An I/O agent (e.g., I/O agent 140A of FIG. 1) receives a first set of aggregation rules from a power management unit (e.g., power management unit 180) (block 605). Also, the I/O agent monitors traffic generating by a plurality of functional units (e.g., functional units 150A-150N), wherein the traffic traverses a communication fabric (e.g., communication fabric 110) (block 610). Additionally, the I/O agent aggregates traffic data from the plurality of functional units (block 615). Next, the I/O agent generates telemetry data from the traffic data based on the first set of aggregation rules (block 620). Then, telemetry data is conveyed by the I/O agent to the power management unit, wherein the power management unit adjusts one or more power settings based on the telemetry data (block 625). After block 625, method 600 ends. It is noted that blocks 610-625 of method 600 may be repeated at regular intervals or in response to certain conditions.

Figure 7:
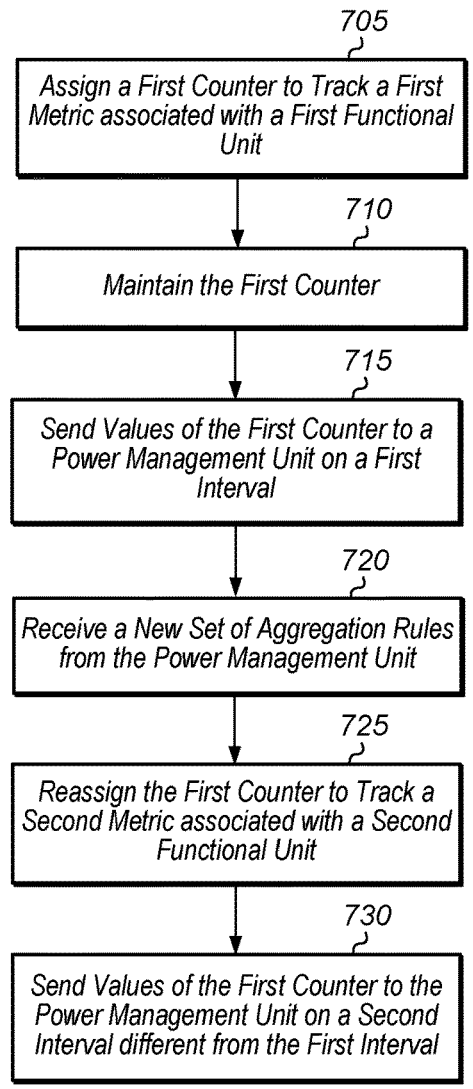
FIG. 7 is a flow diagram of one embodiment of a method for assigning telemetry counters to functional units.

Referring now to FIG. 7, a generalized flow diagram of one embodiment of a method 700 for an I/O agent reassigning counters to track different metrics for different functional units is shown. An I/O agent (e.g., I/O agent 140B of FIG. 1) assigns a first counter to track a first metric associated with a first functional unit (block 705). The first metric can be any parameter or event associated with the first functional unit, such as transactions generated, read responses, read requests, write requests, write responses, and so on. The first functional unit may be any type of device, interface, or component, with the type varying according to the embodiment. The I/O agent maintains the first counter by tracking the first metric during operation of the first functional unit (block 710). The I/O agent sends values of the first counter to a power management unit on a first interval (block 715).

At a later point in time, the I/O agent receives a new set of aggregation rules from the power management unit (block 720). In response to receiving the new set of aggregation rules from the power management unit, the I/O agent reassigns the first counter to track a second metric associated with a second functional unit (block 725). Next, the I/O agent sends values of the first counter to the power management unit on a second interval different from the first interval (block 730). After block 730, method 700 ends.

Turning now to FIG. 8, a generalized flow diagram of one embodiment of a method 800 for aggregating traffic data is shown. An I/O agent (e.g., I/O agent 140N of FIG. 1) monitors a first set of events associated with a plurality of functional units, wherein the first set of events are defined by a first set of aggregation rules (block 805). At a later point in time, the I/O agent receives a second set of aggregation rules from a power management unit (e.g., power management unit 180), wherein the second set of aggregation rules are different from the first set of aggregation rules (block 810). Next, the I/O agent monitors a second set of events associated with the plurality of functional units, wherein the second set of events are different from the first set of events (block 815). Then, the I/O agent generates telemetry data based on the second set of events (block 820). Next, the I/O agent conveys the telemetry data to the power management unit, wherein the power management unit adjusts one or more power settings based on the telemetry data (block 825). For example, based on the telemetry data, the power management unit can change clock frequency settings, supply voltages, memory device settings, and/or other parameters. After block 825, method 800 ends.

Figure 9:
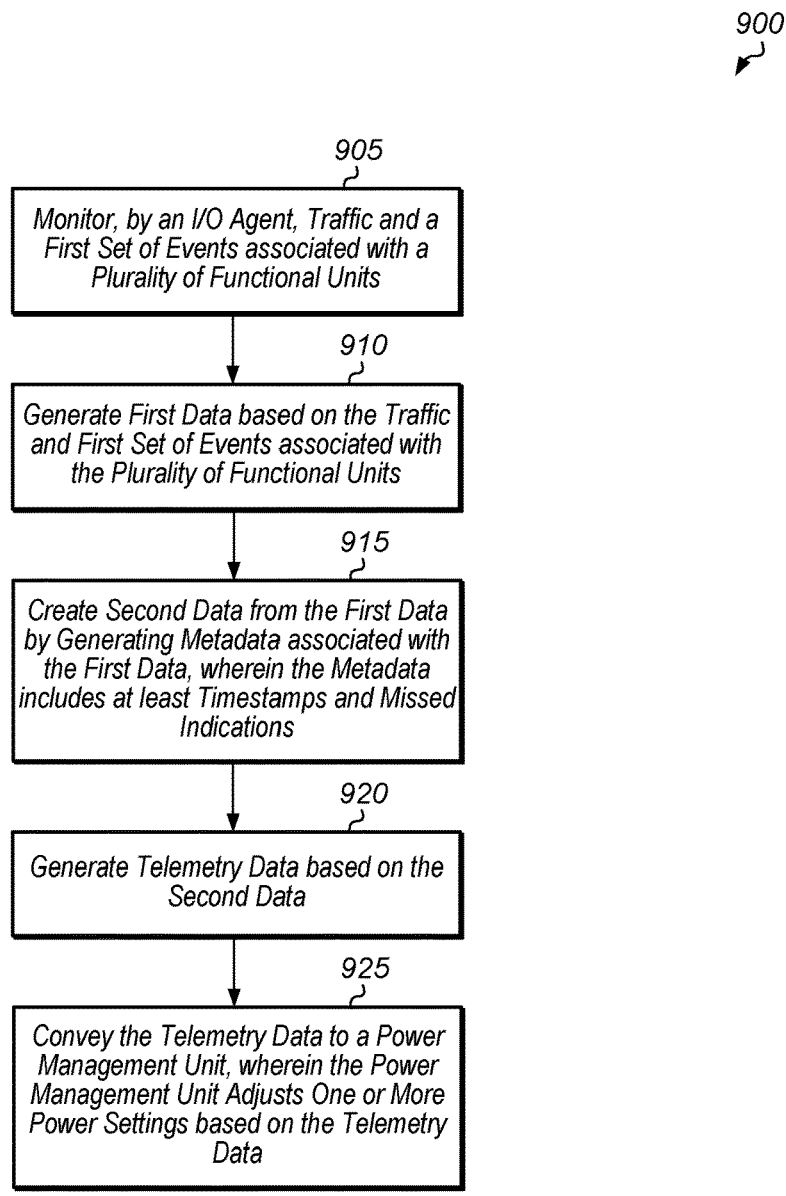
FIG. 9 is a flow diagram of one embodiment of a method for generating telemetry data.

Referring now to FIG. 9, a generalized flow diagram of one embodiment of a method 900 for generating telemetry data is shown. An I/O agent (e.g., I/O agent 140A of FIG. 1) monitors traffic and a first set of events associated with a plurality of functional units (e.g., functional units 150A-150N) (block 905). Next, the I/O agent generates first data based on the traffic and the first set of events associated with the plurality of functional units (block 910). Then, the I/O agent creates second data from the first data by generating metadata associated with the first data, wherein the metadata includes at least timestamps and missed indications (block 915). Next, the I/O agent generates telemetry data based on the second data (block 920). Next, the I/O agent conveys the telemetry data to a power management unit, wherein the power management unit adjusts one or more power settings based on the telemetry data (block 925). After block 925, method 900 ends.

Figure 10:
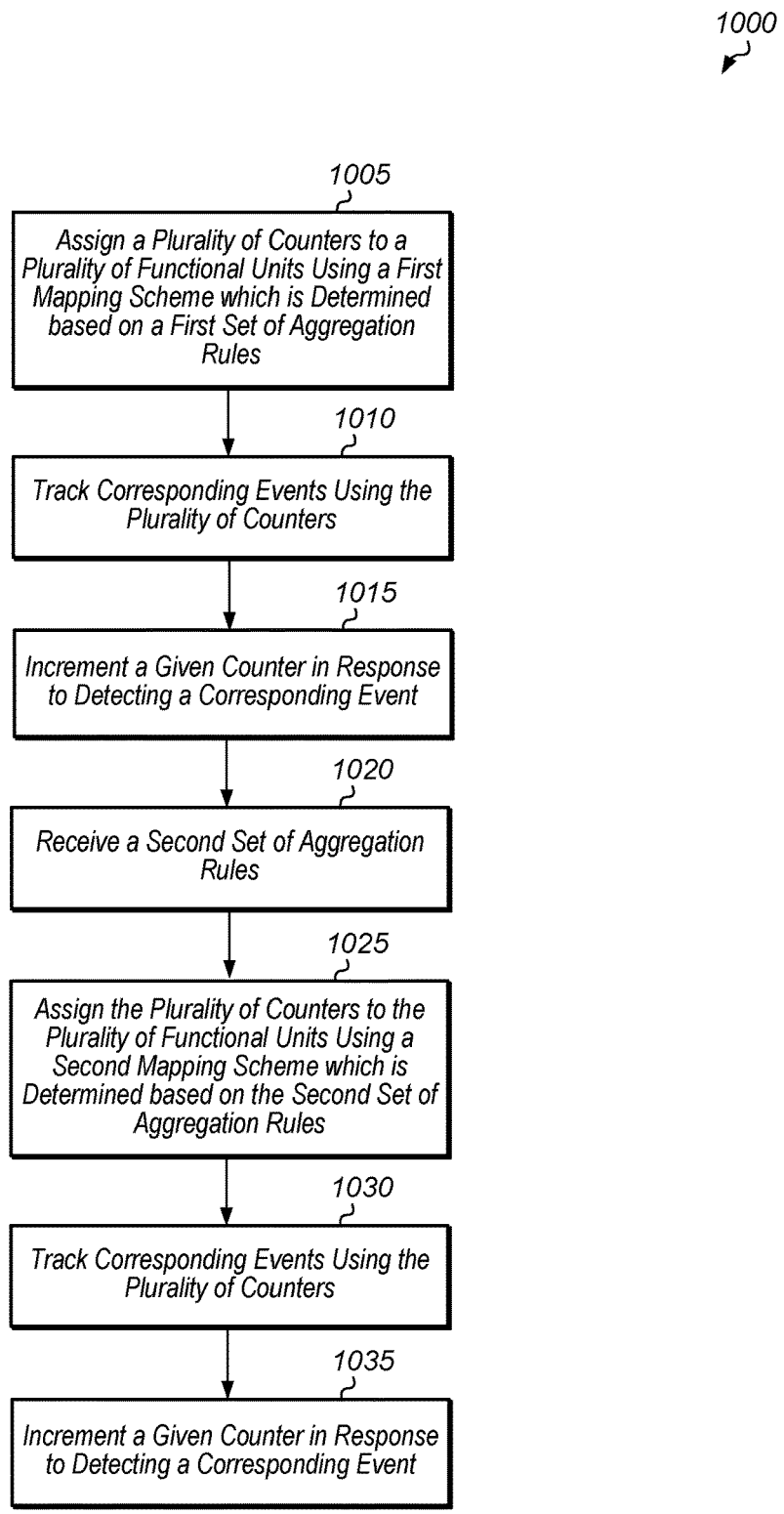
FIG. 10 is a flow diagram of one embodiment of a method for using counters to track functional unit activity.

Turning now to FIG. 10, a generalized flow diagram of one embodiment of a method 1000 for updating mapping schemes for assigning counters to functional units is shown. An I/O agent (e.g., I/O agent 410 of FIG. 4) assigns a plurality of counters (e.g., counters 450A-450N) to a plurality of functional units (e.g., functional units 405A-405N) using a first mapping scheme which is determined based on a first set of aggregation rules (e.g., aggregation rules 440) (block 1005). Next, the I/O agent tracks corresponding events using the plurality of counters (block 1010). Then, the I/O agent increments a given counter in response to detecting a corresponding event (block 1015).

At a later point in time, the I/O agent receives a second set of aggregation rules different from the first set of aggregation rules (block 1020). Next, the I/O agent assigns the plurality of counters to the plurality of functional units using a second mapping scheme which is determined based on a second set of aggregation rules (block 1025). Next, the I/O agent tracks corresponding events using the plurality of counters (block 1030). Then, the I/O agent increments a given counter in response to detecting a corresponding event (block 1035). After block 1035, method 1000 ends.

Figure 11:
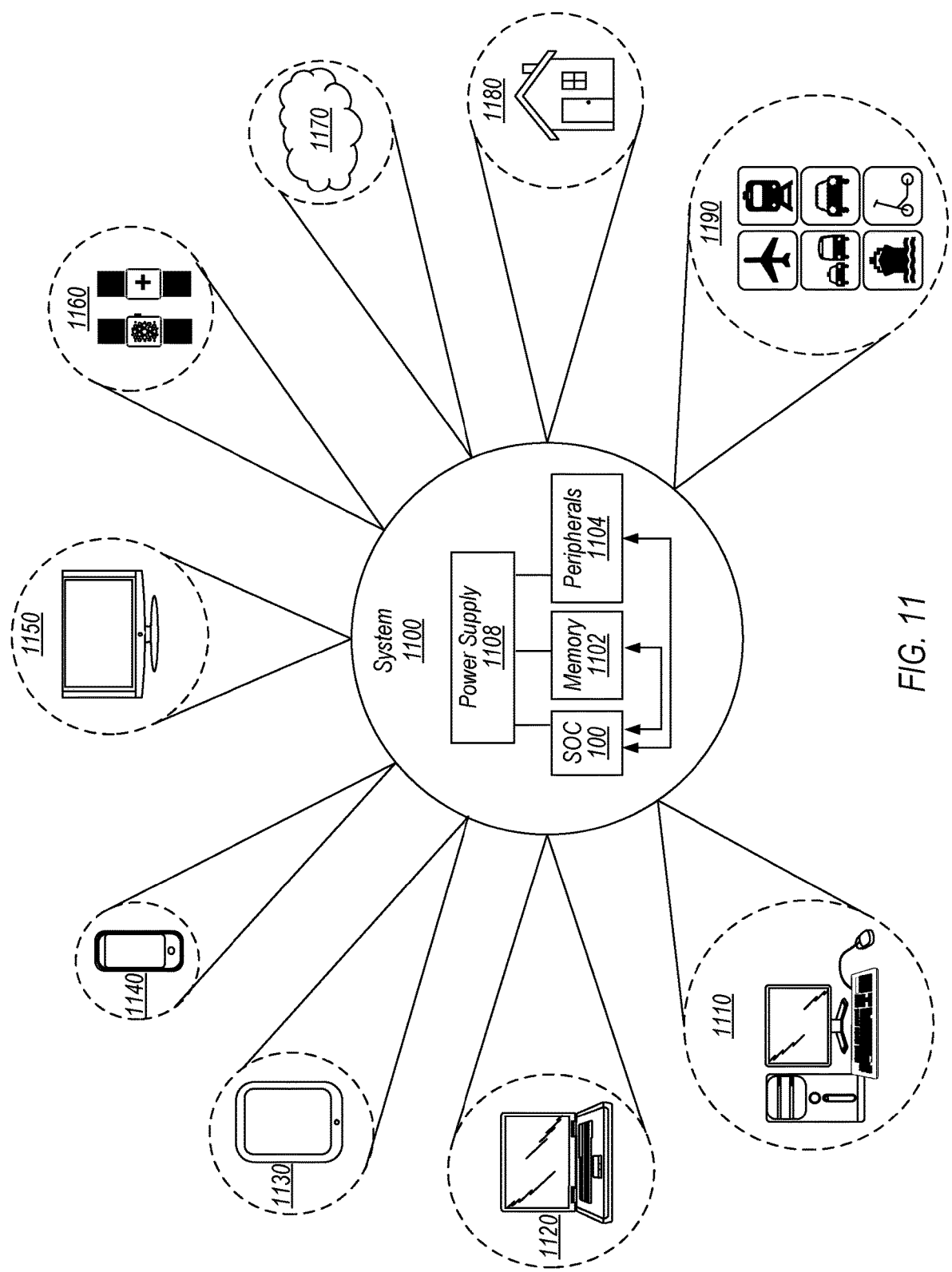
FIG. 11 is a block diagram of one embodiment of a system.

Referring now to FIG. 11, a block diagram of one embodiment of a system 1100 is shown that may incorporate and/or otherwise utilize the methods and mechanisms described herein. In the illustrated embodiment, the system 1100 includes at least a portion of SOC 100 (of FIG. 1) which may include multiple types of processing units, such as a central processing unit (CPU), a graphics processing unit (GPU), or otherwise, a communication fabric, and interfaces to memories and input/output devices. In various embodiments, SoC 100 is coupled to external memory 1102, peripherals 1104, and power supply 1108.

A power supply 1108 is also provided which supplies the supply voltages to SoC 100 as well as one or more supply voltages to the memory 1102 and/or the peripherals 1104. In various embodiments, power supply 1108 represents a battery (e.g., a rechargeable battery in a smart phone, laptop or tablet computer, or other device). In some embodiments, more than one instance of SoC 100 is included (and more than one external memory 1102 may be included as well).

The memory 1102 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1104 include any desired circuitry, depending on the type of system 1100. For example, in one embodiment, peripherals 1104 includes devices for various types of wireless communication, such as wifi, Bluetooth, cellular, global positioning system, etc. In some embodiments, the peripherals 1104 also include additional storage, including RAM storage, solid state storage, or disk storage. The peripherals 1104 include user interface devices such as a display screen, including touch display screens or multi-touch display screens, keyboard or other input devices, microphones, speakers, etc.

As illustrated, system 1100 is shown to have application in a wide range of areas. For example, system 1100 may be utilized as part of the chips, circuitry, components, etc., of a desktop computer 1110, laptop computer 1120, tablet computer 1130, cellular or mobile phone 1140, or television 1150 (or set-top box coupled to a television). Also illustrated is a smartwatch and health monitoring device 1160. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1100 may further be used as part of a cloud-based service(s) 1170. For example, the previously mentioned devices, and/or other devices, may access computing resources in the cloud (i.e., remotely located hardware and/or software resources). Still further, system 1100 may be utilized in one or more devices of a home 1180 other than those previously mentioned. For example, appliances within the home 1180 may monitor and detect conditions that warrant attention. For example, various devices within the home 1180 (e.g., a refrigerator, a cooling system, etc.) may monitor the status of the device and provide an alert to the homeowner (or, for example, a repair facility) should a particular event be detected. Alternatively, a thermostat may monitor the temperature in the home 1180 and may automate adjustments to a heating/cooling system based on a history of responses to various conditions by the homeowner. Also illustrated in FIG. 11 is the application of system 1100 to various modes of transportation 1190. For example, system 1100 may be used in the control and/or entertainment systems of aircraft, trains, buses, cars for hire, private automobiles, waterborne vessels from private boats to cruise liners, scooters (for rent or owned), and so on. In various cases, system 1100 may be used to provide automated guidance (e.g., self-driving vehicles), general systems control, and otherwise. These and many other embodiments are possible and are contemplated. It is noted that the devices and applications illustrated in FIG. 11 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system, comprising:
   a communication fabric;
   a sub-fabric comprising a plurality of peripheral circuits and an interface comprising circuitry connecting the plurality of peripheral circuits with the communication fabric, the circuitry configured to:
      receive a first set of aggregation rules;
      monitor traffic generated by the plurality of peripheral circuits, wherein the traffic traverses the communication fabric;
      aggregate traffic data for the traffic generated by the plurality of peripheral circuits; and
      generate telemetry data based at least in part on the traffic data and the first set of aggregation rules; and
   power management circuitry configured to adjust one or more power settings according to the telemetry data.

2. The system as recited in claim 1, wherein individual rules of the first set of aggregation rules comprise one or more types of transactions to monitor, one or more sources to monitor, one or more endpoints to monitor, an update frequency for sending updates to the power management circuitry, or one or more types of events to count.

3. The system as recited in claim 1, wherein the telemetry data comprises one or more of power consumption data, a number of memory requests generated, a number of write requests generated, a number of read requests generated, a number of instructions executed, a number of cache hits, and a number of cache misses.

4. The system as recited in claim 1, wherein a first interval for requesting the telemetry data from a first peripheral circuit of the plurality of peripheral circuits is specified by the power management circuit, and wherein the telemetry data includes identifiers specifying which peripheral circuit of the plurality of peripheral circuits is associated with the telemetry data.

5. The system as recited in claim 1, further comprising a plurality of counters, wherein the system is configured to:
   assign the plurality of counters to the plurality of peripheral circuits based on the first set of aggregation rules;
   track corresponding events using the plurality of counters; and
   increment a given counter of the plurality of counters when detecting a corresponding event.

6. The system as recited in claim 5, wherein the system is further configured to:
   assign a first counter of the plurality of counters to a first peripheral circuit of the plurality of peripheral circuits based on the first set of aggregation rules;
   receive a second set of aggregation rules from the power management circuit; and
   reassign the first counter to a second peripheral circuit of the plurality of peripheral circuits based on the second set of aggregation rules.

7. The system as recited in claim 5, wherein the system is further configured to maintain a mapping table with mappings of individual ones of the plurality of peripheral circuits to respective ones of the plurality of counters.

8. The system as recited in claim 1, wherein the sub-fabric is one of a plurality of sub-fabrics individually connected to the communication fabric, and wherein the system further comprises one or more processors and one or more memories individually connected via the communication fabric to respective ones of respective peripheral circuits of the respective plurality of sub-fabrics.

9. A method, comprising:
   performing, by an interface comprising circuitry connecting a plurality of peripheral circuits with a communication fabric:
      receiving a first set of aggregation rules;
      monitoring traffic generated by the plurality of peripheral circuits and traversing the communication fabric;
      aggregating traffic data for the traffic generated by the plurality of peripheral circuits; and
      generating telemetry data based at least in part on the traffic data and the first set of aggregation rules; and
   adjusting, by power management circuitry, one or more power settings according to the telemetry data.

10. The method as recited in claim 9, wherein individual rules of the first set of aggregation rules comprise one or more types of transactions to monitor, one or more sources to monitor, one or more endpoints to monitor, an update frequency for sending updates to the power management circuitry, or one or more types of events to count.

11. The method as recited in claim 9, wherein the telemetry data comprises one or more of power consumption data, a number of memory requests generated, a number of write requests generated, a number of read requests generated, a number of instructions executed, a number of cache hits, and a number of cache misses.

12. The method as recited in claim 9, wherein a first interval for requesting the telemetry data from a first peripheral circuit of the plurality of peripheral circuits is specified by the power management circuit, and wherein the telemetry data includes identifiers specifying which peripheral circuit of the plurality of peripheral circuits is associated with the telemetry data.

13. The method as recited in claim 9, further comprising:
assigning a plurality of counters to the plurality of peripheral circuits based on the first set of aggregation rules;
tracking corresponding events using the plurality of counters; and
incrementing a given counter of the plurality of counters when detecting a corresponding event.

14. The method as recited in claim 13, further comprising:
assigning a first counter of the plurality of counters to a first peripheral circuit of the plurality of peripheral circuits based on the first set of aggregation rules;
receiving a second set of aggregation rules from the power management circuit; and
reassigning the first counter to a second peripheral circuit of the plurality of peripheral circuits based on the second set of aggregation rules.

15. An apparatus, comprising:
an interface comprising circuitry connecting a plurality of peripheral circuits with a communication fabric, the circuitry configured to:
receive a first set of aggregation rules;
monitor traffic generated by the plurality of peripheral circuits;
aggregate traffic data for the traffic generated by the plurality of peripheral circuits; and
generate telemetry data, based at least in part on the traffic data and the first set of aggregation rules; and
power management circuitry configured to adjust one or more power settings based at least in part on the telemetry data.

16. The apparatus as recited in claim 15, wherein individual rules of the first set of aggregation rules comprise one or more types of transactions to monitor, one or more sources to monitor, one or more endpoints to monitor, an update frequency for sending updates to the power management circuitry, or one or more types of events to count.

17. The apparatus as recited in claim 15, wherein the telemetry data comprises one or more of power consumption data, a number of memory requests generated, a number of write requests generated, a number of read requests generated, a number of instructions executed, a number of cache hits, and a number of cache misses.

18. The apparatus as recited in claim 15, wherein a first interval for requesting the telemetry data from a first peripheral circuit of the plurality of peripheral circuits is specified by the power management circuit, and wherein the telemetry data includes identifiers specifying which peripheral circuit of the plurality of peripheral circuits is associated with the telemetry data.

19. The apparatus as recited in claim 15, further comprising a plurality of counters, wherein the apparatus is further configured to:
assign the plurality of counters to the plurality of peripheral circuits based on the first set of aggregation rules;
track corresponding events using the plurality of counters; and
increment a given counter of the plurality of counters when detecting a corresponding event.

20. The apparatus as recited in claim 19, wherein the apparatus is further configured to:
assign a first counter of the plurality of counters to a first peripheral circuit of the plurality of peripheral circuits based on the first set of aggregation rules;
receive a second set of aggregation rules from the power management circuit; and
reassign the first counter to a second peripheral circuit of the plurality of peripheral circuits based on the second set of aggregation rules.

* * * * *